(12) United States Patent
Park et al.

(10) Patent No.: US 8,514,321 B2
(45) Date of Patent: Aug. 20, 2013

(54) WAVELENGTH DETECTING APPARATUS AND FOCUS DETECTING APPARATUS HAVING THE SAME

(75) Inventors: Kyong-Tae Park, Suwon-Si (KR); Shitao Deng, Suwon-Si (KR)

(73) Assignee: Samsung Electronics Co., Ltd (KR)

( * ) Notice: Subject to any disclaimer, the term of this patent is extended or adjusted under 35 U.S.C. 154(b) by 380 days.

(21) Appl. No.: 12/604,958

(22) Filed: Oct. 23, 2009

(65) Prior Publication Data

US 2010/0182494 A1 Jul. 22, 2010

(30) Foreign Application Priority Data

Jan. 19, 2009 (KR) .................. 10-2009-0004168

(51) Int. Cl.
*G03B 13/00* (2006.01)
*H04N 5/232* (2006.01)

(52) U.S. Cl.
USPC ............... 348/349; 348/336; 348/345

(58) Field of Classification Search
USPC ........................................... 348/336
See application file for complete search history.

(56) References Cited

U.S. PATENT DOCUMENTS

| | | | |
|---|---|---|---|
| 5,701,005 A | 12/1997 | Meyers | |
| 6,363,220 B1 * | 3/2002 | Ide | 396/98 |
| 6,597,401 B1 * | 7/2003 | Maruyama | 348/335 |
| 2004/0240868 A1 * | 12/2004 | Iwasaki | 396/56 |
| 2006/0066957 A1 | 3/2006 | Fukui | |

FOREIGN PATENT DOCUMENTS

| | | |
|---|---|---|
| GB | 2 402 227 | 12/2004 |
| JP | 2005-055768 | 3/2005 |
| JP | 2007-298331 | 11/2007 |

OTHER PUBLICATIONS

European Search Report issued in European Application No. 09174154.6, mailed Dec. 8, 2009.
English lanugauge abstract of JP 2007-298331, published Nov. 15, 2007.
Machine English lanugauge translation of JP 2007-298331, published Nov. 15, 2007.
English lanugauge abstract of JP 2005-055768, published Mar. 3, 2005.
Machine English lanugauge translation of JP 2005-055768, published Mar. 3, 2005.

* cited by examiner

*Primary Examiner* — Anthony J Daniels
(74) *Attorney, Agent, or Firm* — The Farrell Law Firm, P.C.

(57) ABSTRACT

A wavelength detecting apparatus capable of detecting the main wavelength of the light coming into an image capture apparatus and a focus detecting apparatus using the same are disclosed. The wavelength detecting apparatus may include a spectral unit which separates the incoming light according to the respective wavelengths, and may focus the separated light onto a sensor. The main wavelength can be determined based on the wavelength distribution sensed by the sensor. The determined wavelength can be used to further determine amount of adjustment to be made to the defocus amount to compensate for the chromatic aberration associated with the wavelength of the light illuminating the source.

10 Claims, 7 Drawing Sheets

WAVELENGTH DETECTING APPARATUS AND FOCUS DETECTING APPARATUS HAVING THE SAME

CROSS-REFERENCE TO RELATED APPLICATIONS

This application claims the benefit under 35 U.S.C. §119(a) of Korean Patent Application No. 10-2009-4168, filed Jan. 19, 2009, in the Korean Intellectual Property Office, the entire disclosures of both of which are hereby incorporated by reference.

TECHNICAL FIELD

The present disclosure relates generally to a focus detecting apparatus, and, more particularly, to a focus detecting apparatus capable of correcting an error according to the type of light source, which illuminates a subject.

BACKGROUND OF RELATED ART

An autofocus function for automatically adjusting the focus on a subject is incorporated in wide variety of image capture apparatuses such as cameras for convenience of user. A focus detecting apparatus implementing such a autofocus function detects the state of focus of the photographing lens and a defocus amount by which the photographing lens is out of focus so that the automatic adjustments of the focus can be made accordingly.

In a conventional camera, an error may occur in detecting the focus state of a lens due to the chromatic aberration that may result from the differences in the reflective index of various light illumination sources according to the respective wavelengths. For example, in general, it may be preferable to take the focus of a subject based on a wavelength (approximately 587 nm) of green which is most sensitive to the human eye. However, the wavelength component of the light source illuminating the subject may changes according to the surrounding environment. As a focus detecting apparatus detects the focus state of the photographing lens based on the light projected onto the focus detecting apparatus, if the main wavelength component of the light source illuminating the subject is significantly different from the wavelength of green, a precise focusing on the subject may be difficult.

In an environment without sufficient light illumination, a supplemental or external light source, e.g., a flash light, may be used. In those situations, infrared light sources are generally used as the supplemental light source. However, since the wavelength of infrared rays deviates significantly from the wavelength of green, the use of such supplemental light source may exacerbate the imprecision in the detection of the focus state of the lens.

While some prior attempts to address the various types of light illumination with respect to focus detecting apparatuses have been made, these attempts fail to adequately compensate for the variation in the light illumination, and may require many additional components to determine the type of light source or illumination, which in turn may result in the increase in the manufacturing cost, lowered productivity and the increase in the overall size of the image capture apparatus.

SUMMARY OF DISCLOSURE

According to an aspect of the present disclosure, there may be provided a wavelength detecting apparatus for use in an image capture apparatus that may include a spectral unit, a focusing lens and a wavelength calculation unit. The spectral unit may be configured to separate an incident light incident thereupon into multiple light beams each having a respective corresponding one of wavelengths of the incident light. The focusing lens may be arranged in an optical path of the multiple light beams, and may be configured to focus each of the multiple light beams onto a sensor. The wavelength calculation unit may be configured to calculate a main wavelength of light received into the image capture apparatus according to a wavelength distribution of the multiple light beams sensed by the sensor.

The multiple light beams may be focused on respective locations of the sensor that are at least in part spatially different from one another according to the respective wavelengths of the multiple light beams.

The sensor may comprise a plurality of photoelectric elements. Each photoelectric element may sense an amount of light in a specific wavelength band.

The plurality of photoelectric elements may be arranged consecutively along a line.

The wavelength detecting apparatus may further comprise a light amount calculation unit configured determine a total amount of light sensed by the sensor.

The spectral unit may comprise a diffractive optical element.

The diffractive optical element may be a blazed diffractive optical element.

The spectral unit and the focusing lens may be arranged in such a manner that each of the multiple light beams focused onto the sensor unit has a diffractive order of ±1.

The depth of the diffractive optical element may be in a range between a first depth and a second depth. The wavelength detecting apparatus may have a first maximum diffraction efficiency associated a minimum wavelength detected by the wavelength detecting apparatus when the depth of the diffractive optical element is the first depth. The wavelength detecting apparatus may have a second maximum diffraction efficiency associated a maximum wavelength detected by the wavelength detecting apparatus when the depth of the diffractive optical element is the second depth.

The depth of the diffractive optical element may be an optimal depth with which the respective diffraction efficiencies of the wavelength detecting apparatus associated with a minimum wavelength detected by the wavelength detecting apparatus and a maximum wavelength detected by the wavelength detecting apparatus are substantially the same.

According to another aspect of the present disclosure, a focus calculation unit for calculating a defocus amount by which to adjust focus on a subject an image of which being captured by an image capture apparatus may be provided to include a primary defocus calculation unit, a wavelength detecting device, a correction amount calculation unit and a secondary defocus calculation unit. The primary defocus calculation unit may be configured to calculate a primary defocus amount according to a difference between a pair of images of the subject formed on an autofocus (AF) sensor. The wavelength detecting device may be configured to detect a main wavelength of an incoming light received into the image capture apparatus. The correction amount calculation unit may be configured to calculate a chromatic aberration correction amount based on the main wavelength. The secondary defocus calculation unit may be configured to calculate the defocus amount by adding the chromatic aberration correction amount to the primary defocus amount. The wavelength detecting device may comprise a spectral unit, a focusing lens and a wavelength calculation unit. The spectral unit may be configured to separate an incident light incident thereupon into multiple light beams each having a respective corresponding one of wavelengths of the incident light. The focusing lens may be arranged in an optical path of the multiple light beams, and may be configured to focus each of the multiple light beams onto an optical sensor. The wavelength calculation unit may be configured to calculate the main wavelength of the incoming light received into the image capture apparatus according to a wavelength distribution of the multiple light beams sensed by the optical sensor.

The focus calculation unit may further comprise a chromatic aberration data storage unit having stored therein chromatic aberration feature data associated with the image capture apparatus.

The chromatic aberration feature data may be transferred to the chromatic aberration data storage unit from a lens unit detachably installed in the image capture apparatus.

According to yet another aspect of the present disclosure, an image acquiring apparatus for acquiring an image of a subject may be provided to include a photographing lens unit and an autofocus (AF) detection device. The photographing lens unit may have one or more lenses arranged in an optical path along which an incoming light received into the image acquiring apparatus from the subject travels to an image capture area to thereby form an optical image of the subject on the image capture area. The AF detection device may be configured to determine a defocus amount by which to move at least one of the one or more lenses of the photographing lens unit to thereby bring the photographing lens unit into focus with respect to the subject, and may be configured to determine the defocus amount based on at least a main wavelength associated with the incoming light and a difference between two images of the subject both of which are acquired using the incoming light.

The AF detection device may comprise a spectral unit, a focusing lens and a defocus amount calculation unit. The spectral unit may have an incident surface upon which at least a portion of the incoming light is incident, and may be configured to separate the incoming light that is incident thereupon into a plurality of constituent wavelength components thereof. The focusing lens may be arranged to receive the plurality of constituent wavelength components, and may be configured to focus each the plurality of constituent wavelength components on respective locations of an optical sensor that are at least in part spatially different from one another according to respective wavelengths of the plurality of constituent wavelength components. The defocus amount calculation unit may be configured to determine the defocus amount by adding a primary defocus amount obtained based on the difference between the two images of the subject to a chromatic aberration correction amount obtained based on the main wavelength of the incoming light.

The defocus amount calculation unit may be configured to obtain the chromatic aberration correction amount according to a corresponding relationship between wavelengths and changes in focal lengths of the photographing lens unit.

The corresponding relationship between wavelengths and changes in focal lengths of the photographing lens unit may define a reference wavelength at which a change in the focal length of the photographing lens unit is zero.

The reference wavelength may be within a visible light spectrum corresponding to green color.

The photographing lens unit may be detachably mounted in the image acquiring apparatus, and may comprise a memory device having stored therein chromatic aberration feature data associated with the photographing lens unit. The chromatic aberration feature data may be indicative of the corresponding relationship between wavelengths and changes in focal lengths of the photographing lens unit. The AF detection device may be configured to receive the chromatic aberration feature data from the memory device of the photographing lens unit.

The spectral unit may comprise a blazed diffractive optical element having a formed thereon pattern of diffractive grooves each having a triangular cross-sectional profile.

BRIEF DESCRIPTION OF THE DRAWINGS

Various objects, features and advantages of embodiments of the present disclosure will become more apparent from the following description taken in conjunction with the accompanying drawing, in which.

DETAILED DESCRIPTION OF SEVERAL EMBODIMENTS

Figure 1:
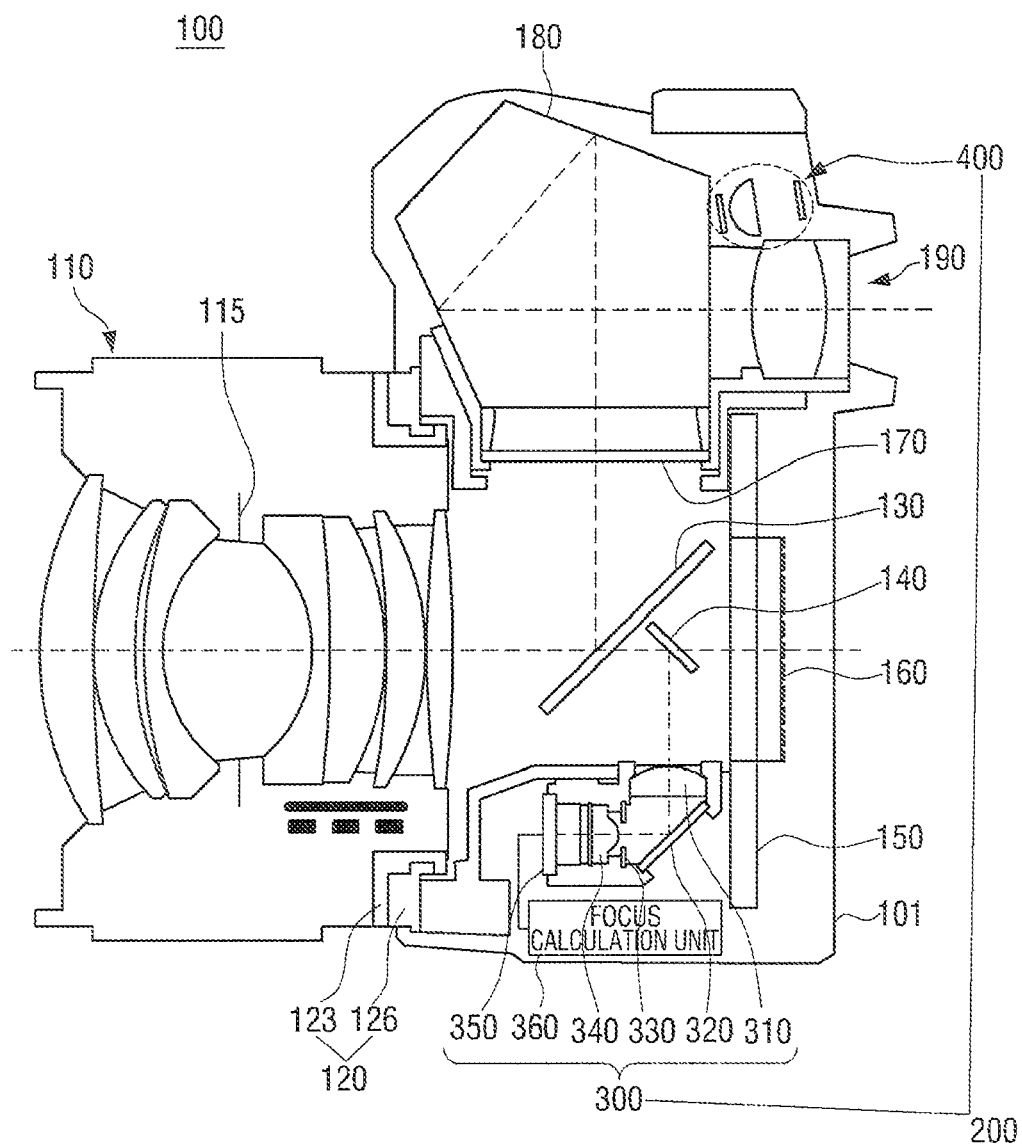
FIG. 1 is a schematic perspective view illustrating the structure of an image capture apparatus according to an embodiment of the present disclosure.

Reference will now be made in detail to the embodiment, examples of which are illustrated in the accompanying drawings, wherein like reference numerals refer to like elements throughout. While the embodiments are described with detailed construction and elements to assist in a comprehensive understanding of the various applications and advantages of the embodiments, it should be apparent however that the embodiments may be carried out without those specifically detailed particulars. Also, well-known functions or constructions will not be described in detail so as to avoid obscuring the description with unnecessary detail. It should be also noted that in the drawings, the dimensions of the features are not intended to be to true scale and may be exaggerated for the sake of allowing greater understanding.

FIG. 1 is a schematic perspective view of an image capture apparatus according to an embodiment of the present disclosure. An enlarged perspective view of a wavelength detecting apparatus according to an embodiment of the present disclosure usable in the image capture apparatus of FIG. 1.

For purposes of illustration and of convenience, the image capture apparatus 100 will be referred to as a digital single-lens reflex (DSLR) camera. It should however be noted that aspects of the present disclosure may be applicable to other types of image capture apparatuses.

As illustrated in FIG. 1, the image capture apparatus 100 according to an embodiment may include a lens unit 110, a mount 120, a main mirror 130, a sub mirror 140, a focal-plane shutter 150, an image capture area 160, a focusing screen 170, a pentaprism 180, an eyepiece 190 and a focus detecting apparatus 200.

The lens unit 110 may be configured to focus the light received from a subject on the image capture area 160. As illustrated in FIG. 1, the lens unit 110 may include a plurality of lenses. In some DSLR cameras, the lens unit 110 may be interchangeable.

In some embodiments, the lens unit 110 may additionally include a vibration correction apparatus (not shown) and/or an autofocus driving unit (not shown). The vibration correction apparatus may be configured to compensate for the degradation in the image quality resulting from the user's hand shaking while taking a picture. The autofocus driving unit may be configured to receive information regarding the focus state of the lens unit 110 from the focus detecting apparatus 200, and may be configured to move the focusing lens according to the information. As both the vibration correction apparatus and the autofocus driving unit are well known to those skilled in the art, detailed descriptions thereof are unnecessary, and thus will be omitted.

The lens unit 110 may further include an iris 115. The iris 115 may operate to adjust the amount of light passing through the lens unit 110, and may also affect the depth of field of the acquired image. That is, if the iris 115 is open wider, the lens unit 110 passes a large amount of light, so the user can obtain a brighter image. However, with the wide opening of the iris 115, the lens aperture also becomes larger resulting in a reduction in the depth of field. If on the other hand, the iris 115 opening is narrower, the lens unit 110 passes a smaller amount of light so that a darker image may be acquired while the depth of field may become deeper owing to the smaller lens aperture.

The mount 120 may allow the coupling of the lens unit 110 to a body 101 of the image capture apparatus 100. The mount 120 may be configured to allow the lens unit 110 to be mounted to the body 101 in such a manner the optical axis of the lens unit 110 is aligned with the center of the image capture area 160.

The mount 120 may include a lens mount 123 and a body mount 126. The lens mount 123 engages with the body mount 126 so that the lens unit 110 is fixed to the body 101 of the image capture apparatus 100.

The main mirror 130 allows a portion of light that has passed through the lens unit 110 and that is thus incident upon the main mirror 130 to be transmitted therethrough, and reflects the remainder of the incident light. The reflected portion of the light goes through the focusing screen 170 so that the user can view the subject through the eyepiece 190. The portion of the light transmitted through the main mirror 130 may proceed to the focus detecting apparatus 200, and may be used by the focus detecting apparatus 200 in detecting the focus state of the lens unit 110.

The sub mirror 140 may be arranged to guide the light transmitted through the main mirror 130 to the focus detecting apparatus 200.

The focal-plane shutter 150 may be disposed in front of the image capture area 160, and may consist of two black curtains or metal films; which are typically referred to as front and rear curtains. The focal-plane shutter 150, during when a photograph is taken, operates in such a manner that the front curtain opens so that the image capture area 160 is exposed to light, followed by the closing of the rear curtain so as to intercept the light from reaching the image capture area 160. That is, the focal-plane shutter 150 adjusts the exposure time by adjusting the speed of the shutter, that is the time difference between the front curtain opening and the rear curtain closing.

The image capture area 160 is an area that configured to become exposed to light so that the image of the subject can be captured. During the time of capturing the image of the subject, the main mirror 130 and the sub mirror 140 may be retracted or otherwise removed from the optical path so that the light from the lens unit 110 becomes incident upon the image capture area 160. In a film camera, a film is placed in the image capture area 160, whereas in a digital camera, image sensors are arranged on the image capture area 160. Examples of such image sensors may include charge-coupled devices (CCDs) and complementary metal-oxide-semiconductors (CMOS) sensors. Presently, CCDs are used in most digital cameras because of the higher sensitivity of the CCDs to even low intensity light and the generally good image quality realizable with the CCDs. However, the CCD has complicated manufacturing process, and are comparatively more expensive than the CMOS sensors. The CMOS sensor owing to its simpler manufacturing process and lower costs is generally used in cheaper digital cameras. However, with the recent developments in the image processing technology that have made it possible to achieve a high image quality with a newer CMOS sensor, the use of the CMOS sensors are becoming increasingly wide spread, and can be found even in some DSLR cameras intended for professional use.

The focusing screen 170 may include a mat plane and a fresnel lens. The mat plane is disposed in a position optically equivalent to the image capture area 160. Accordingly, substantially the same image as the captured image appears on the mat plane. The fresnel lens may concentrate or focus the light passing through the mat plane so that the user can view a brighter image through the eyepiece 190.

The pentaprism 180 may be a five-sided reflecting prism. The pentaprism 180 may convert the vertically or laterally inversed (i.e., upside-down or left-right inversed) image projected on the focusing screen 170 into a normal upright image so that an image may be viewed through the view finder in the same proper orientation as the actual subject observed with naked eye.

The eyepiece 190 may create a virtual image, e.g., at one meter in front thereof, so that the user may view the image of the subject projected on the focusing screen 170 that is properly framed. Accordingly, the user may be able to view the image to be captured through the eyepiece 190.

The focus detecting apparatus 200 may be configured to detect the focus state of the lens unit 110, and, may, according to an embodiment, include an autofocus (AF) module 300 and a wavelength detecting apparatus 400.

The AF module 300 according to an embodiment may include a field lens 310, a reflecting mirror 320, a visual field mask 330, a separating lens 340, an AF sensor 350 and a focus calculation unit 360.

The field lens 310 concentrates the light incident on the focus detecting apparatus 200 to the AF sensor 350, and may be disposed close to a primary image plane.

The reflecting mirror 320 is arranged to reflect light incident on the AF module 300 toward the AF sensor 350. The reflecting mirror 320, by changing the direction of the light received by the AF nodule 300 toward the AF sensor 350 as shown in FIG. 1, requires less height of the AF module 300 that would otherwise be required with the reflecting mirror 320, and thus allows an efficient use of the space within the image capture apparatus 100.

The visual field mask 330 may include, for example, a plurality of holes, the light having passed therethrough being divided by the separating lens 340 so that a pair of subject images is projected on the AF sensor 350.

The AF sensor 350 may include a plurality of photoelectric elements, which convert the pair of subject images projected on the AF sensor 350 into electrical signals.

The focus calculation unit 360 calculates the focus state of the lens unit 110 and the amount of defocus by analyzing the electrical signals provided by the AF sensor 350. For example, by analyzing the electrical signals provided by the AF sensor 350, the distance between the pair of subject images could be obtained. That is, using the phase difference detection method, the focus state of the lens unit 110 and the amount of defocus can be calculated using the distance between the pair of subject images. As the phase difference detection method is well known to those skilled in the art, a detailed description thereof is thus omitted for the sake of brevity.

Figure 2:
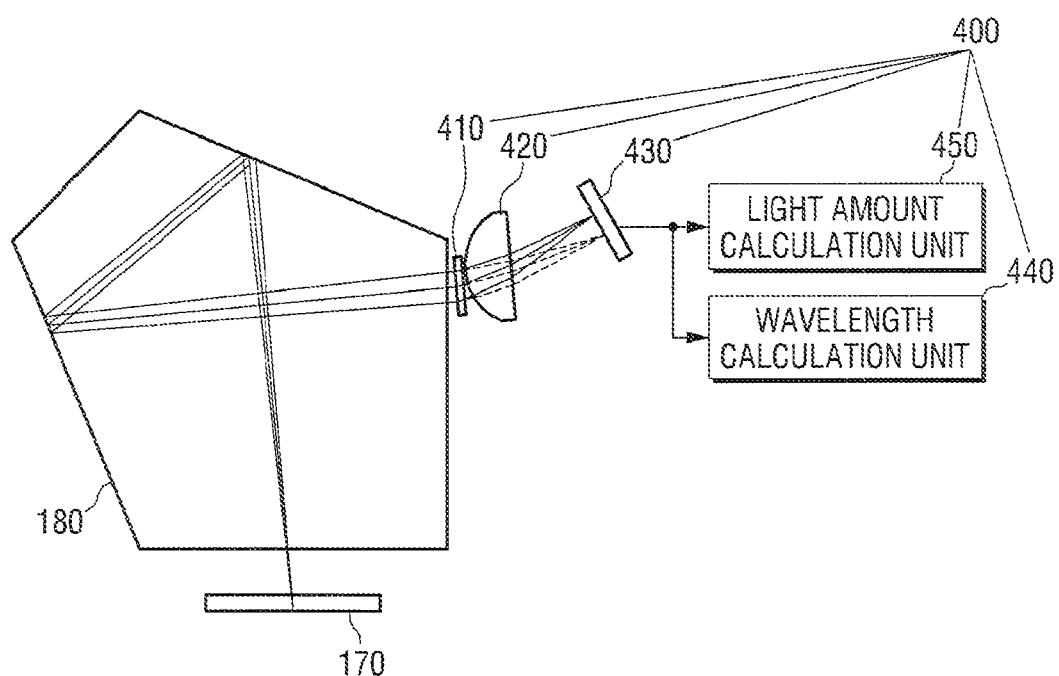
FIG. 2 is a enlarged perspective view of a wavelength detecting apparatus shown in FIG. 1.

The wavelength detecting apparatus 400 may be configured to detect the main wavelength of the light coming into the image capture apparatus 100. As illustrated in FIG. 2, the wavelength detecting apparatus 400 according to an embodiment may include a spectral unit 410, a focusing lens 420, a sensor unit 430, a wavelength calculation unit 440 and a light amount calculation unit 450.

The spectral unit 410 may be configured and arranged to separate the light according to the wavelength. The spectral unit 410 may be a diffractive optical element according to an embodiment, and in alternative embodiments may be implemented as any other device capable of separating light according to the wavelengths.

Figure 3:
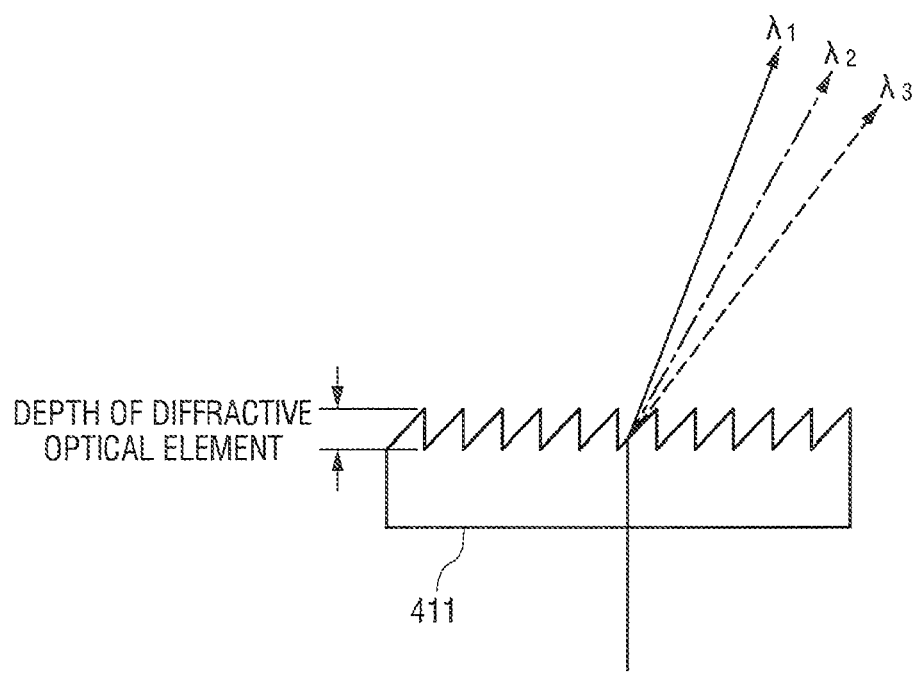
FIG. 3 illustrates a diffractive optical element as an example of a spectral unit according to an embodiment of the present disclosure.

FIG. 3 illustrates a diffractive optical element 411 as an example of the spectral unit 410. The diffractive optical element 411 shown in FIG. 3 may be a blazed diffractive optical element. As illustrated in FIG. 3, the light passing through the diffractive optical element 411 may become separated according to the wavelengths. For example, the light incident upon the diffractive optical element 411 may become separated into a beam of light having a wavelength of $\lambda_1$ (shown with the solid arrow line), a beam of light having a wavelength of $\lambda_2$ (shown with the dashed dotted line) and a beam of light having a wavelength of $\lambda_3$ (shown with the dotted line).

The focusing lens 420 focuses the light separated by the spectral unit 410 onto the sensor unit 430. By the spectral unit 410 and the focusing lens 420, the light coming into the wavelength detecting apparatus 400 can be focused on separate areas of the sensor unit 430 according to the wavelength.

Figure 4:
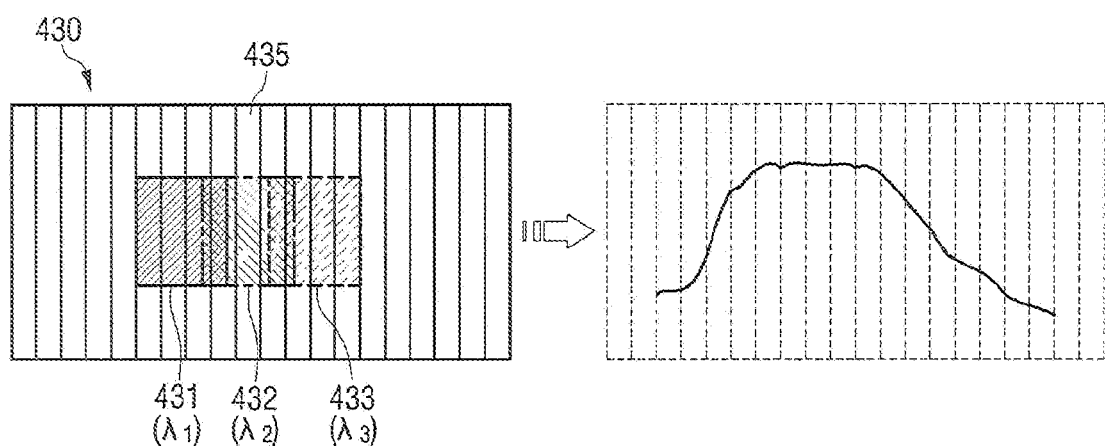
FIG. 4 illustrates a sensor unit and an example of the intensity of light sensed by the sensor unit according to an embodiment of the present disclosure.

FIG. 4 illustrates a plan schematic view of the sensor unit 430 according to an embodiment and the intensity of light sensed by the sensor unit 430.

The sensor unit 430 may include a plurality of photoelectric elements. The sensor unit 430 converts the image, which is separated according to the wavelength and focused on separate areas on the sensor unit 430, into electrical signals. As illustrated in FIG. 4, the plurality of photoelectric elements may be arranged along a row or line.

A process of focusing the light beams separated according to their wavelengths on the sensor unit 430 will now be described in greater detail with reference to FIGS. 2 through 4. Illustrated in FIG. 2 are the optical paths of the three beams of various wavelengths passing though a point on the focusing screen 170. The light beams are separated according to their wavelength by the spectral unit 410, and pass through the focusing lens 420 to be focused on the sensor unit 430. Each of such beams separate according to the respective wavelengths as, for example, illustrated in FIG. 3, three beams each having a wavelength of $\lambda_1$, $\lambda_2$ and $\lambda_3$, respectively, are focused on different positions on the sensor unit 430.

For example, referring to FIG. 4, three beams each having a wavelength of $\lambda_1$, $\lambda_2$ and $\lambda_3$, respectively, may be focused correspondingly on three different areas of the sensor unit 430, namely, the first area 431 (shaded with solid lines), the a second area 432 (shaded with dashed dotted lines) and a third area 433 (shaded with dotted lines), respectively. As shown in FIG. 4, some overlapping between the areas could occur. As described above, the light incident upon the wavelength detecting apparatus 400 is separated into several beams according to the respective wavelengths by the spectral unit 410. The separated beams are focused by the focusing lens 420 onto different portions of or locations on the sensor unit 430

In other words, according to an embodiment, each of the photoelectric elements of the sensor unit 430, e.g., those shown in FIG. 4, may be arranged so as to sense the amount of light in of a specific wavelength band. For example, the one photoelectric element 435 shown in FIG. 4 may senses the amount of light in a wavelength band that ranges between $\lambda_2 - \Delta\lambda$ and $\lambda_2 + \Delta\lambda$. The value of $\Delta\lambda$ may depend on several factors such as, for example, the width of the photoelectric element, the diffraction angle of the spectral unit 410 with respect to the respective wavelengths and the like. Since each photoelectric element can senses the amount of light in a specific wavelength band, the wavelength distribution of light received into the image capture apparatus 100 can be obtained, for example, from the light intensity distribution, e.g., one shown in FIG. 4.

According to an embodiment, the wavelength calculation unit 440 may determine the main wavelength of the light received into the image capture apparatus 100 according to the wavelength distribution sensed by the sensor unit 430. For example, the wavelength calculation unit 440 may calculate the average wavelength in the wavelength distribution sensed by the sensor unit 430, and may determine the resulting average wavelength as being the main wavelength of the light received into the image capture apparatus 100.

According to an embodiment, the light amount calculation unit 450 may be configured to calculate the amount of light entering the wavelength detecting apparatus 400 according to the total amount of the light sensed by the sensor unit 430. For example, the light amount calculation unit 450 may calculate the amount of the light entering the wavelength detecting apparatus 400 by summing up the amount of light sensed by the plurality of the photoelectric element in the sensor unit 430.

The amount of the light entering the wavelength detecting apparatus 400 is transmitted to an auto exposing apparatus (not shown) for use by the auto exposing apparatus in automatically adjusting the exposure of a subject. As described above, since the wavelength detecting apparatus 400 according to an embodiment of the present disclosure can obtain the amount of light as well as the main wavelength of light, the wavelength detecting apparatus 400 can function as a metering sensor.

If the diffractive optical element 411 is used as the spectral unit 410, the intensity of diffractive light passing through the diffractive optical element 411 could become low. If the intensity of the diffractive light becomes too low, the sensor unit 430 may not be able to detect the resulting diffractive light of such low intensity. Accordingly, the diffraction efficiency may need to be maintained at certain sufficiently high level. To that end, according to an embodiment of the present disclosure, diffractive light having grating order of ±1 rather than those of ±2 or more diffractive grating order, which generally tend to have lower diffraction efficiencies, may preferably be focused on the sensor unit 430. In addition, a blazed diffractive optical element as illustrated in FIG. 3 may be used as the spectral unit 410.

The diffraction efficiency may also depends on the depth of the diffractive optical element 411. Accordingly, an appropriately depth of the diffractive optical element 411 may thus need to be a part of the design consideration.

Figure 5:
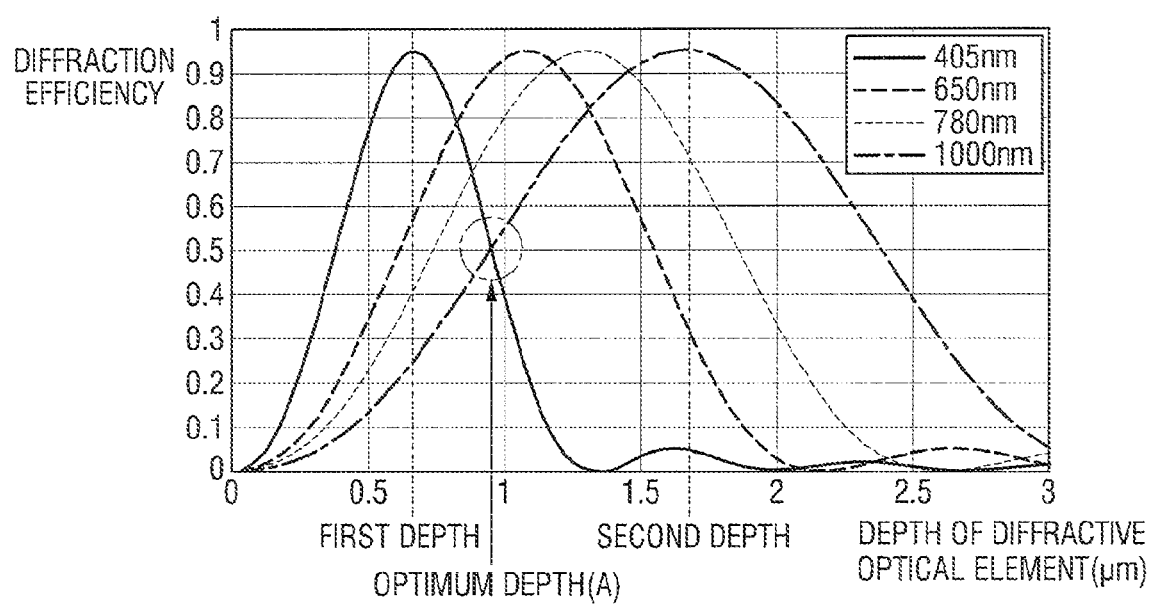
FIG. 5 is a graph illustrating the diffraction efficiency according to the depth of the diffractive optical element according to an embodiment of the present disclosure.

For example, FIG. 5 provides a graph illustrative of the diffraction efficiency according to the depth of the diffractive optical element 411. As illustrated in FIG. 5, the diffraction efficiency varies according to the change in the wavelength. For illustrative purposes, it is assumed in this example that the wavelength detecting apparatus 400 is designed to measure a range of wavelengths, e.g., between 405 nm (the minimum wavelength to be measured) and 1000 nm (the maximum wavelength to be measured). It can be observed from FIG. 5 that the wavelength of 405 nm has the maximum diffraction efficiency at the first depth while, for the wavelength of 1000 nm, the maximum diffraction efficiency is with the second depth. For the wavelength range between 405 nm and 1000 nm may have the maximum diffraction efficiency when the depth of the diffractive optical element 411 is between the first depth and the second depth. Accordingly, in an embodiment, the depth of the diffractive optical element 411 may be selected to be a depth between the first depth and the second depth. More preferably, the optimum depth (A) of the diffractive optical element 411 may be a point in which diffraction efficiency of the minimum wavelength (405 nm) and diffraction efficiency of the maximum wavelength (1000 nm) are substantially the same. As illustrated in FIG. 5, if the diffractive optical element 411 has the optimum depth (A), the diffraction efficiency for all of the wavelengths between the minimum wavelength (405 nm) and the maximum wavelength (1000 nm) may be higher than 50%.

The focus calculation unit 360 will now be described in greater detail with reference to FIGS. 6 and 7.

Figure 6:
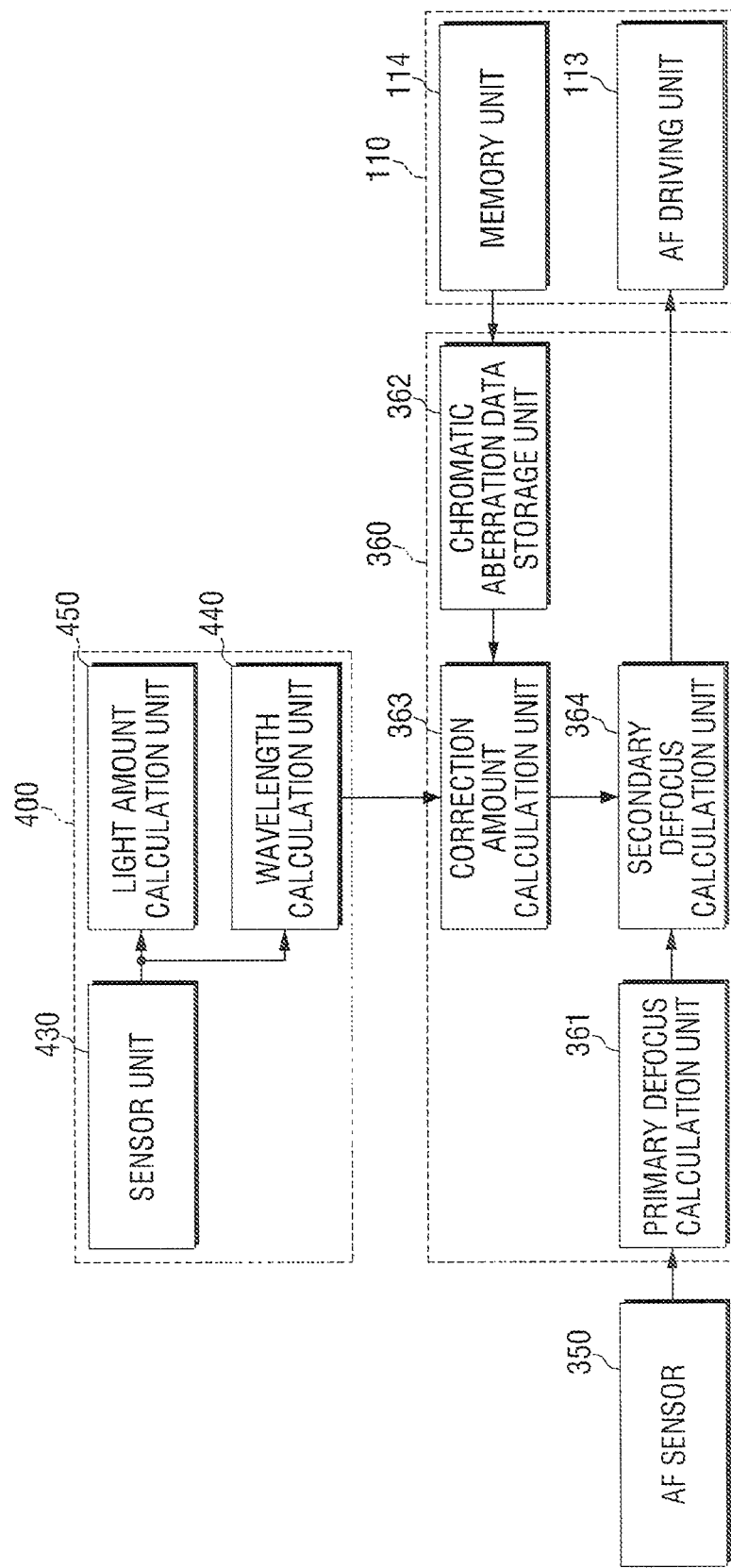
FIG. 6 is a block diagram illustrating a focus calculation unit according to an embodiment of the present disclosure.

FIG. 6 is a block diagram of relevant portions of the image capture apparatus 100 for the purposes of illustration of a focus calculation unit 360 according to an embodiment of the present disclosure. FIG. 7 is a graph illustrative of an example of the change in the focal length according to the chromatic aberration.

The focus calculation unit 360 according to an embodiment may include a primary defocus calculation unit 361, a chromatic aberration data storage unit 362, a correction amount calculation unit 363 and a secondary defocus calculation unit 364.

The primary defocus calculation unit 361 may be configured to calculate a primary defocus amount according to the distance between a pair of subject images generated on the AF sensor 350 using the phase difference detection method. The phase difference detection method is well known to those skilled in the art, and thus need not be described in detail.

Figure 7:
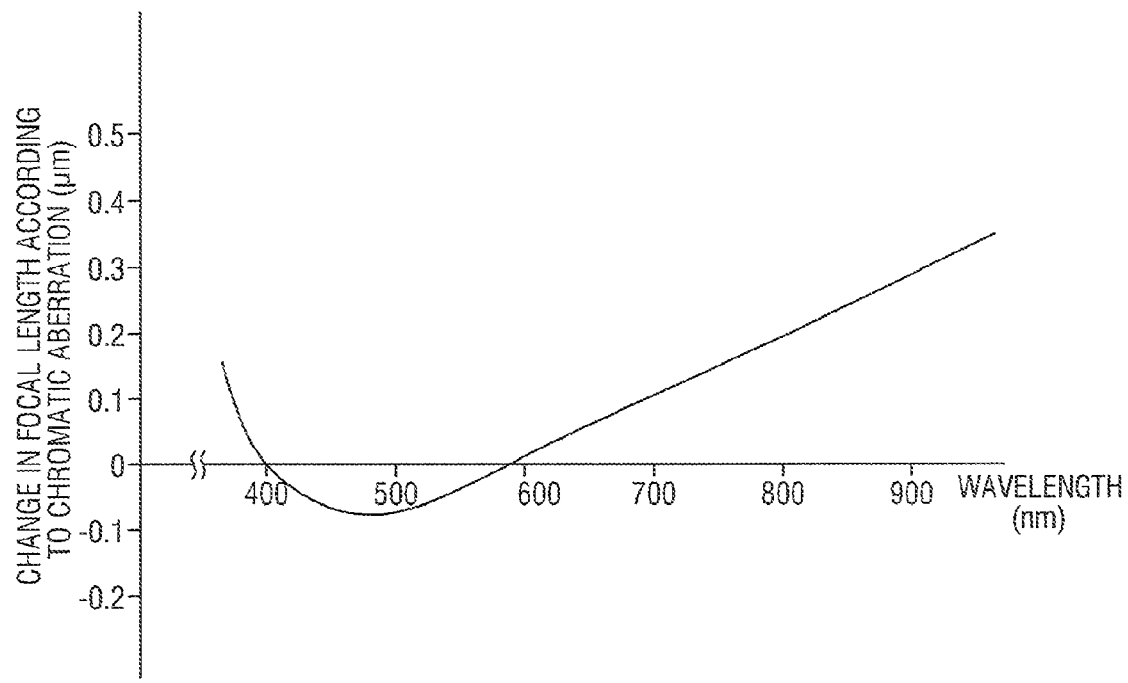
FIG. 7 is a graph illustrating change in focal length according to chromatic aberration according to an embodiment of the present disclosure.

Referring to FIG. 7, the x-axis and the y-axis represent the wavelength and the change in the focal length according to the chromatic aberration, respectively. The wavelength of 587 nm is taken as a reference value in FIG. 7. It can be seen from FIG. 7 that for the wavelength of 800 nm, the corresponding focal length may be approximately 0.2 mm longer than the focal length at the reference wavelength of 587 nm. As previously mentioned, the AF module 300 detects the focus state of the lens unit 110 based on the light incident upon the AF module 300. It may however be preferred to detect the focus of the subject based on the reference wavelength (approximately 587 nm) corresponding to green, to which human eye is most sensitive. Thus, according to an embodiment of the present disclosure, if the main wavelength of the light incident upon the AF module 300 is 800 nm, it may be preferred to further adjust the defocus amount by approximately 0.2 mm.

The actual relationship between the wavelength and the focal length may be different from the relationship illustrated in FIG. 7, and may vary according to the chromatic aberration features of the lens unit 110 and the AF module 200. The actual relationship may be obtained empirically through an experiment or analytically after the fabrication of the lens unit 110 and the AF module 300.

The chromatic aberration data storage unit 362 may store therein the data relating to the chromatic aberration feature of the image capture apparatus 100. That is, the chromatic aberration data storage unit 362 may store data regarding the chromatic aberration feature of the AF module 300 and data regarding the chromatic aberration feature of the lens unit 110.

As described above, the lens unit 110 may be interchangeably mounted in the image capture apparatus 100 according to an embodiment of the present disclosure. When the lens unit 110 is exchanged with another, the chromatic aberration feature of the newly installed lens unit 110 may be different from that of the lens unit 100 that is replaced. According to an embodiment, the memory unit 114 of each lens unit 110 may have stored therein the chromatic aberration feature data of for the lens unit 110. The chromatic aberration feature data stored in the memory unit 114 of each lens unit 110 may be transferred to the chromatic aberration data storage unit 362, for example, upon mounting of such lens unit 110 to the image capture apparatus 100.

The correction amount calculation unit 363 may calculate the chromatic aberration correction amount based on the main wavelength detected by the wavelength detecting apparatus 400 and the chromatic aberration feature data stored in the chromatic aberration data storage unit 362. That is, the correction amount calculation unit 363 may calculate the chromatic aberration correction amount based on the main wavelength calculated by the wavelength calculation unit 440 of the wavelength detecting apparatus 400 and based on the relationship between the wavelength and the change in the focal length associated with the chromatic aberration feature of the lens unit 110. For example, for lens unit 110 that has the relationship between the wavelength and the change in the focal length as illustrated in FIG. 7, if the main wavelength calculated by the wavelength calculation unit 440 is 800 nm, the chromatic aberration correction amount calculated by the correction amount calculation unit 363 may be −0.2 mm.

The secondary defocus calculation unit 364 may calculate the final defocus amount by adding the chromatic aberration correction amount calculated by the correction amount calculation unit 363 to the primary defocus amount calculated by the primary defocus calculation unit 361. The obtained final defocus amount is then used by the AF driving unit 113 of the lens unit 110 to move the photographing lens by the final defocus amount in order to focus the photographing lens on the subject.

As can be appreciated from the above description, the wavelength detecting apparatus 400 is capable of detecting the main wavelength of light coming into the image capture apparatus 100. The correction amount calculation unit 363 calculates a chromatic aberration correction amount according to the main wavelength detected by the wavelength detecting apparatus 400. Accordingly, even when the wavelength component of the light source illuminating the subject is different from the wavelength (approximately 587 nm) of green, which may be the preferred wavelength as it may be most sensitive to the human eye, such wavelength differences can be taken into account during the focus of the subject according to one or more aspects of the present disclosure.

It should be noted that, while a detailed structure for each of the primary defocus calculation unit 361, the secondary defocus calculation unit 364, the correction amount calculation unit 363, the wavelength calculation unit 440 and the light amount calculation unit 450 is not depicted in the figures hereof, as would be readily understood by those skilled in the art, one or more of these units may be implemented with, e.g., a microprocessor, a microcontroller, or the like, that includes a CPU to execute one or more computer instructions to implement the various control operations herein described and/or control operations relating to other components of the image capture apparatus 100, and to that end may further include a memory device, e.g., a Random Access Memory (RAM), Read-Only-Memory (ROM), a flesh memory, or the like, to store the one or more computer instructions. Further, according to various embodiments, some or all of the various units 361, 363, 364, 440 and 450 may be implemented as a set or sets of computer instruction executable by a single microprocessor, a microcontroller, or the like.

While the present disclosure has been particularly shown and described with reference to several embodiments thereof with particular details, it will be apparent to one of ordinary skill in the art that various changes may be made to these embodiments without departing from the principles and spirit of the invention, the scope of which is defined in the following claims and their equivalents.

What is claimed is:

1. A focus detecting apparatus for use in an image capture apparatus, comprising:
    an AutoFocus (AF) module that detects a focus state of a lens unit of the image capture apparatus and an amount of defocus; and
    a wavelength detecting apparatus that detects a main wavelength of an incident light coming into the image capture apparatus,
    wherein the wavelength detecting apparatus comprises:
        a spectral unit configured to separate the incident light incident thereupon into multiple light beams each having a respective corresponding one of wavelengths of the incident light;
        a focusing lens arranged in an optical path of the multiple light beams, the focusing lens being configured to focus each of the multiple light beams onto a sensor; and
        a wavelength calculation unit configured to calculate an average wavelength of light received into the image capture apparatus according to a wavelength distribution of the multiple light beams sensed by the sensor.

2. The focus detecting apparatus of claim 1, wherein the multiple light beams are focused on respective locations of the sensor that are at least in part spatially different from one another according to the respective wavelengths of the multiple light beams.

3. The focus detecting apparatus of claim 1, wherein the sensor comprises a plurality of photoelectric elements, each photoelectric element sensing an amount of light in a specific wavelength band.

4. The focus detecting apparatus of claim 3, wherein the plurality of photoelectric elements are arranged consecutively along a line.

5. The focus detecting apparatus of claim 1, further comprising:
    a light amount calculation unit configured to determine a total amount of light sensed by the sensor.

6. The focus detecting apparatus of claim 1, wherein the spectral unit comprises a diffractive optical element.

7. The focus detecting apparatus of claim 6, wherein the diffractive optical element is a blazed diffractive optical element.

8. The focus detecting apparatus of claim 6, wherein the spectral unit and the focusing lens are arranged in such a manner that each of the multiple light beams focused onto the sensor unit has a diffractive order of ±1.

9. The focus detecting apparatus of claim 6, wherein a depth of the diffractive optical element is in a range between a first depth and a second depth, the wavelength detecting apparatus having a first maximum diffraction efficiency associated a minimum wavelength detected by the wavelength detecting apparatus when the depth of the diffractive optical element is the first depth, the wavelength detecting apparatus having a second maximum diffraction efficiency associated a maximum wavelength detected by the wavelength detecting apparatus when the depth of the diffractive optical element is the second depth.

10. The focus detecting apparatus of claim 6, wherein a depth of the diffractive optical element is an optimal depth with which the respective diffraction efficiencies of the wavelength detecting apparatus associated with a minimum wavelength detected by the wavelength detecting apparatus and a maximum wavelength detected by the wavelength detecting apparatus are substantially the same.

* * * * *